(12) United States Patent
Niessner et al.

(10) Patent No.: US 10,658,818 B2
(45) Date of Patent: May 19, 2020

(54) COMBUSTION ENGINE WITH PRE-CHAMBER SPARK PLUG

(71) Applicant: Federal-Mogul Ignition GmbH, Neuhaus-Schierschnitz (DE)

(72) Inventors: Werner Niessner, Steinheim (DE); Matthias Blankmeister, Heiligenhaus (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 37 days.

(21) Appl. No.: 15/945,048

(22) Filed: Apr. 4, 2018

(65) Prior Publication Data

US 2018/0294625 A1 Oct. 11, 2018

(30) Foreign Application Priority Data

Apr. 10, 2017 (DE) .................. 10 2017 107 683

(51) Int. Cl.
*H01T 13/08* (2006.01)
*F02B 19/12* (2006.01)
(Continued)

(52) U.S. Cl.
CPC .............. *H01T 13/08* (2013.01); *F02B 19/12* (2013.01); *H01T 13/06* (2013.01); *H01T 13/54* (2013.01)

(58) Field of Classification Search
CPC ......... H01T 13/08; H01T 13/54; H01T 13/06; F02B 19/12
See application file for complete search history.

(56) References Cited

U.S. PATENT DOCUMENTS 2,652,044 A 9/1953 Phillips
3,830,205 A 8/1974 Date et al.
(Continued)

FOREIGN PATENT DOCUMENTS

DE 4419429 A1 12/1995
DE 102012009333 A1 11/2013
(Continued)

OTHER PUBLICATIONS

Mattias Auer; Erstellung phänomenologischer Modelle zur Vorausberechnung des Brennverlaufes von Magerkonzept-Gasmotoren; Section : "Fremdgezündete Motoren mit ungespütter Vorkammer" ; p. 12 ; Dated Apr. 15, 2010.
(Continued)

*Primary Examiner* — Joseph J Dallo
(74) *Attorney, Agent, or Firm* — Reising Ethington, P.C.

(57) ABSTRACT

An internal combustion engine having: a housing with at least one cylinder and a pre-chamber spark plug; the cylinder has a piston that is able to move in the housing and delimits a combustion chamber contained in the housing; the combustion chamber has a compressed volume when the piston is at top dead center; the pre-chamber spark plug has a body, an external thread at its front end, a passage, an insulator positioned in the passage, a center electrode protruding from the front end of the insulator, and a pre-chamber-forming cap that is placed at the front end of the body and delimits a pre-chamber. The cap shields the center electrode from the combustion chamber and has at least one opening, which enables a gas exchange between the pre-chamber and the combustion chamber. In one embodiment, the total volume of the pre-chamber makes up at least 0.65% of the compressed volume of the combustion chamber.

15 Claims, 4 Drawing Sheets

(51) Int. Cl.
*H01T 13/06* (2006.01)
*H01T 13/54* (2006.01)

(56) References Cited

U.S. PATENT DOCUMENTS

| | | |
|---|---|---|
| 3,980,057 A | 9/1976 | Sanda et al. |
| 4,020,817 A | 5/1977 | Noguchi et al. |
| 4,077,368 A | 3/1978 | Abthoff et al. |
| 4,114,569 A | 9/1978 | Yamakawa et al. |
| 4,178,903 A | 12/1979 | Yanagihara et al. |
| 4,319,552 A | 3/1982 | Sauer et al. |
| 5,611,307 A | 3/1997 | Watson |
| 6,814,064 B2 | 11/2004 | Cowans |
| 7,922,551 B2 | 4/2011 | Tozzi |
| 8,324,792 B2 | 12/2012 | Maul et al. |
| 8,584,648 B2 | 11/2013 | Chiera et al. |
| 9,093,823 B2 | 7/2015 | Sakakura et al. |
| 9,476,348 B2 | 10/2016 | Tozzi et al. |
| 9,617,908 B2 | 4/2017 | Willi |
| 2013/0026381 A1 | 1/2013 | Huang et al. |
| 2014/0060479 A1 | 3/2014 | Tozzi et al. |
| 2014/0102404 A1 | 4/2014 | Sotiropoulou et al. |
| 2014/0261296 A1 | 9/2014 | Sotiropoulou et al. |
| 2015/0059456 A1* | 3/2015 | Niessner ............... F02P 15/006 73/114.19 |
| 2017/0104316 A1* | 4/2017 | Niessner ................ H01T 13/54 |
| 2018/0123324 A1* | 5/2018 | Niessner ................ H01T 13/08 |
| 2018/0294624 A1* | 10/2018 | Niessner ................ H01T 13/54 |
| 2018/0294625 A1* | 10/2018 | Niessner ................ H01T 13/54 |
| 2018/0294626 A1* | 10/2018 | Niessner ............... H01T 13/467 |

FOREIGN PATENT DOCUMENTS

| | | |
|---|---|---|
| EP | 2525452 A1 | 11/2012 |
| GB | 2049046 A | 12/1980 |
| JP | 5239004 B2 | 7/2013 |
| JP | 5995748 B2 | 9/2016 |
| RU | 2201512 C1 | 3/2003 |
| RU | 2204031 C1 | 5/2003 |

OTHER PUBLICATIONS

Office action issued by the German Patent and Trademark Office for application No. DE 102017107 683.2.

* cited by examiner

COMBUSTION ENGINE WITH PRE-CHAMBER SPARK PLUG

This application claims the benefit of German Application No. 10 2017 107 683.2, filed on Apr. 10, 2017, the contents of which are hereby incorporated by reference in their entirety.

FIELD

The present invention is generally related to a combustion engine with one or more pre-chamber spark plugs, as well as the pre-chamber spark plugs themselves.

BACKGROUND

To date, there are known various types of internal combustion engines having pre-chamber spark plugs. In one such example, the engine includes: a housing with a cylinder and a pre-chamber spark plug; the pre-chamber spark plug has a body, an external thread at its front end, a passage, an insulator positioned in the passage, a center electrode protruding from the front end of the insulator, and a pre-chamber-forming cap, which is placed at the front end of the body and delimits a pre-chamber; and the cap shields the center electrode from the combustion chamber and has an opening, which enables a gas exchange between the pre-chamber and the combustion chamber.

SUMMARY

An object of the present design is to improve an internal combustion engine and/or a pre-chamber spark plug of the type mentioned above.

This object may be attained by means of an internal combustion engine with different combinations of features, such as those listed in the claims. The internal combustion engine according to the present design has a housing with at least one cylinder and a pre-chamber spark plug. The housing can include an engine block and a cylinder head. The cylinder has a piston that is able to move in the housing and delimits a combustion chamber contained in the housing. The volume of the combustion chamber changes as the piston moves. The volume of the combustion chamber when the piston is at top dead center is referred to as the "compressed volume." The pre-chamber spark plug has a body with an external thread on its front end. The body has a passage in which an insulator is fastened and a center electrode protrudes from the front end of this insulator. The front end of the insulator is also referred to as the "insulator foot." The center electrode can form a spark gap with the inner wall of the pre-chamber. Alternatively, at least one ground electrode can be provided, which is connected to the body in an electrically conductive fashion and forms a spark gap with the center electrode. At the front end of the body, a pre-chamber-forming cap is provided, which delimits a pre-chamber. The cap shields the center electrode—and if present, also the ground electrode—from the combustion chamber and has at least one opening, which permits a gas exchange between the pre-chamber and the combustion chamber. It can be a passive pre-chamber spark plug in which the pre-chamber is supplied with fuel exclusively from the combustion chamber of the internal combustion engine, namely via the at least one opening in the cap. In particular, the passive pre-chamber spark plug does not contain any fuel supply conduits that supply additional fuel directly to the pre-chamber. According to one embodiment, the total volume of the pre-chamber makes up at least 0.65% of the compressed volume of the combustion chamber. The total volume of the pre-chamber can lie in the range from 0.65% to 1.9%, in particular 0.7% to 1%, of the compressed volume of the combustion chamber.

The present design may enjoy the following advantages:

In gasoline-powered spark-ignition engines, the present design can improve lean-burn operation and enable a reliable, large-volume ignition in the combustion chamber by means of ignition torches or flame jets that shoot out from the openings in the cap, in particular even when the exhaust recirculation rate is relatively high.

The piston displacement of the cylinder of the internal combustion engine according to the present design can lie in the range from 300 $cm^3$ to 800 $cm^3$, in particular from 300 $cm^3$ to 500 $cm^3$. It has surprisingly turned out that especially with a piston displacement of this kind, a particularly good ignition can be achieved if the total volume of the pre-chamber is chosen to be relatively large and makes up at least 0.65% of the compressed volume of the combustion chamber. With a compressed volume of the combustion chamber in the range from 30 $cm^3$ to 100 $cm^3$, in particular from 50 $cm^3$ to 80 $cm^3$, this can be achieved with a total volume of the pre-chamber in the range from 0.2 $cm^3$ to 1 $cm^3$, in particular from 0.3 $cm^3$ to 0.8 $cm^3$.

In another embodiment, the internal combustion engine can have a plurality of cylinders. Each cylinder has a combustion chamber, a conduit feeding into the latter, and a pre-chamber spark plug. In all of the pre-chamber spark plugs of the internal combustion engine, the opening in the cap can have the same orientation in relation to the conduit. In all of the cylinders of an internal combustion engine, this can ensure a defined orientation of the flame jet—which shoots out from the opening during the ignition event—in the combustion chamber and can improve the ignition of a lean mixture therein. The opening in the cap can be oriented obliquely to the center line of the external thread. In particular, the center line of the opening, especially the center line of each of the openings in a cap, can intersect the center line of the external thread. This can produce an essentially swirl-free, high-turbulence flow in the pre-chamber, thus making it possible to ensure a good flushing of the pre-chamber and a reliable ignition. The high turbulence or high "turbulent kinetic energy" also ensures an acceleration of the combustion. The angle between the center line of the opening and the center line of the external thread can be from 30° to 80°, in particular from 45° to 60°. The cap can have 3 to 9 openings, in particular 4 to 6 of them. The at least one opening can have a diameter of 0.6 mm to 1.6 mm, in particular 0.8 mm to 1.4 mm.

In the body, an annular seat surface for the insulator can be provided at which the passage narrows, viewed from the back end to the front end. The front end of the insulator, i.e. the insulator foot, protrudes forward beyond the seat surface into the pre-chamber and is spaced apart from the body by a spacing distance of at least 1.2 mm extending in the circumference direction. The spacing distance between the front end of the insulator and the pre-chamber wall can in particular be 1.4 mm or more. When viewed from the back to the front, the passage can narrow at a point situated between the annular seat surface for the insulator and the fastening point of the ground electrode. The constriction situated between the annular seat surface for the insulator and the ground electrode, in particular the fastening point of the ground electrode on the body, can enable an improved fastening of the ground electrode. The ground electrode can contact the body along more of its length. It is thus possible to lengthen the weld between the ground electrode and the body. The constriction can in particular protrude into the pre-chamber "like a balcony" behind the ground electrode. The passage can have its smallest free cross-section at the constriction that supports the ground electrode. The passage of the body can thus narrow at two points; it is also possible for the passage to widen between the two constrictions. The passage—viewed from the back to the front—can widen at a point situated between the annular seat surface for the insulator and the front end of the insulator, i.e. in the vicinity of the insulator foot. In the vicinity of the insulator foot, an open annular space can be produced, which is large enough to ensure a good flushing of the pre-chamber.

In another embodiment, the pre-chamber can be divided by an imaginary dividing plane into a front part and a back part. The dividing plane extends perpendicular to the center line of the external thread and is positioned at an end surface of the center electrode that protrudes from the insulator. The front part of the pre-chamber is situated on the side of the dividing plane oriented toward the front end of the spark plug and the back part of the pre-chamber is situated on the side of the dividing plane oriented toward the back end of the spark plug. The back part of the pre-chamber is situated inside the spark plug, in particular inside the body. Since the dividing plane only conceptually divides the pre-chamber into two parts, they remain connected to each other at the dividing plane. Apart from this connection of the back part of the pre-chamber to the front part of the pre-chamber at the dividing plane, the back part of the pre-chamber is closed in a gastight fashion. "Gastight" means that aside from the gas exchange with the front part of the pre-chamber taking place at the dividing plane, no gases can escape from the back part of the pre-chamber during operation. The volume of the back part of the pre-chamber is greater than the volume of the front part of the pre-chamber. The volume of the back part of the pre-chamber can be greater than the volume of the front part of the pre-chamber by a factor of 1.5 to 2.0, in particular by a factor of 1.6 to 1.7. This can achieve an enlarged space downstream of the spark gap into which residual gases from the previous power stroke of the engine can be displaced during a compression stroke. Thanks to this enlarged storage space for residual gases, a practically undiluted fresh fuel/air mixture can be present at the ignition gap between the center electrode and the ground electrode, thus enabling improved ignition by the sparks.

DRAWINGS

Other advantages and features of the present design ensue from the following description of some exemplary embodiments in connection with the figures. In the drawings.

DESCRIPTION

Figure 1:
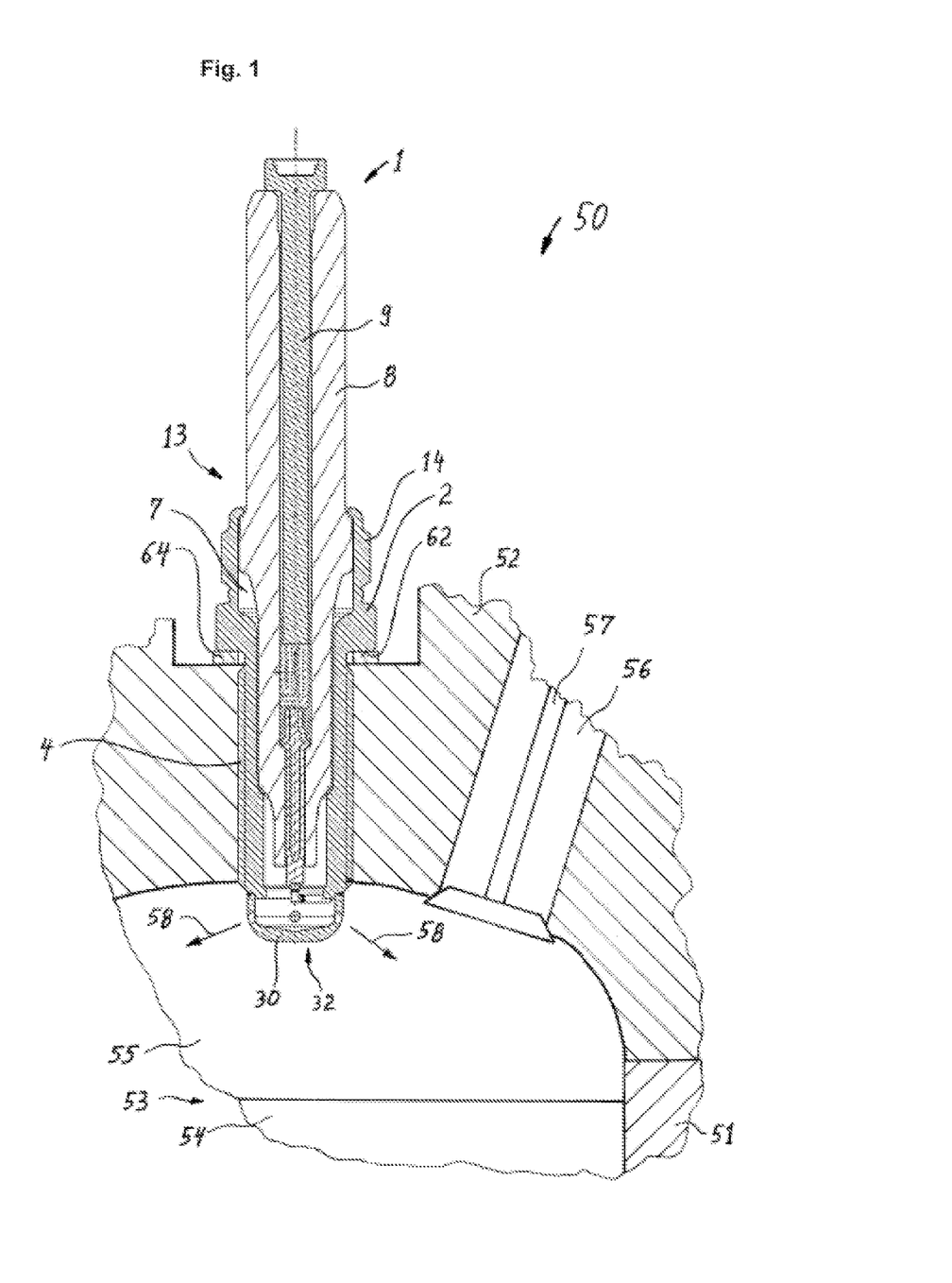
FIG. 1 is a section through a part of an internal combustion engine according to the present design, which is equipped with a pre-chamber spark plug.
Figure 2:
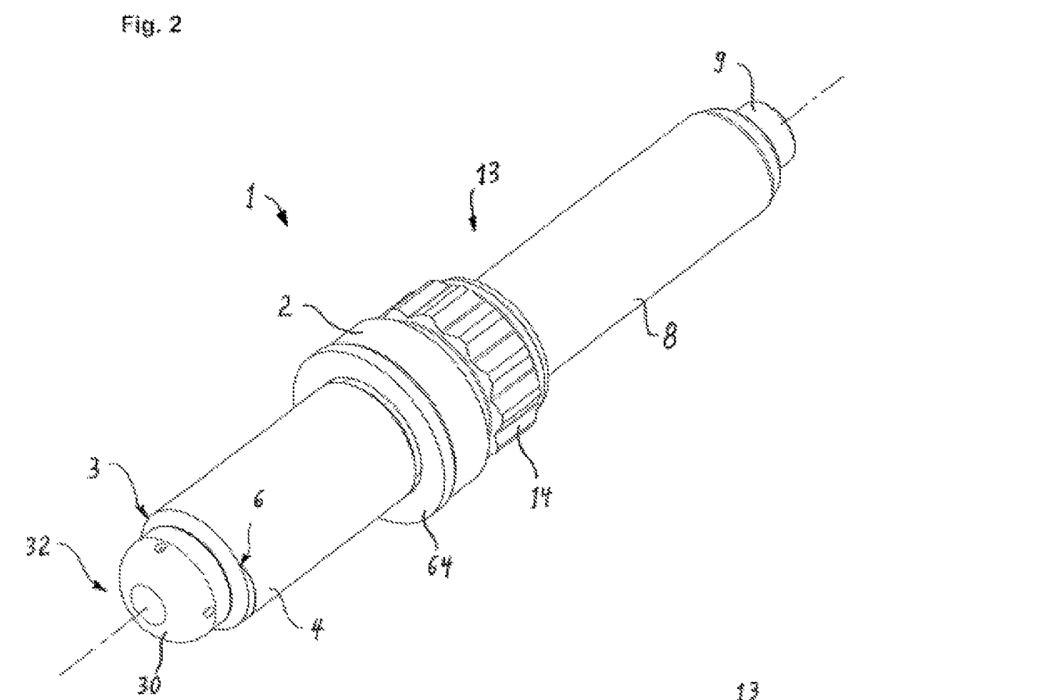
FIG. 2 is a perspective view of the pre-chamber spark plug from FIG. 1.
Figure 3:
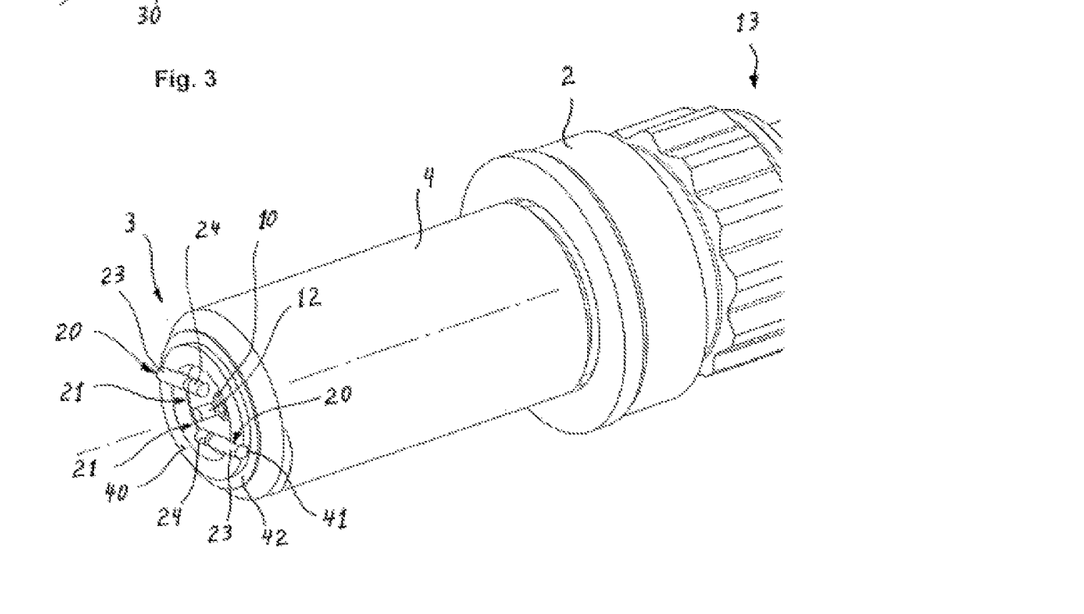
FIG. 3 shows the region of the front end of the pre-chamber spark plug from FIG. 2 with the cap removed.
Figure 4:
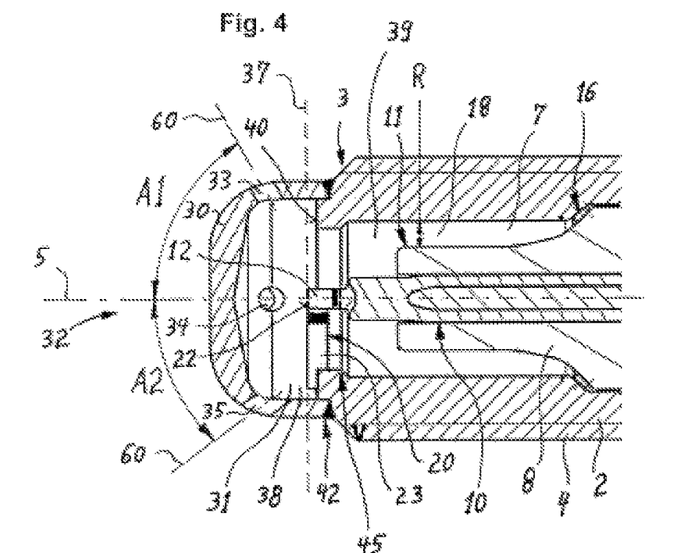
FIG. 4 shows an enlarged longitudinal section through the region of the front end of the pre-chamber spark plug from FIG. 1.

FIGS. 1 through 6 show a pre-chamber spark plug 1 with a metallic body 2 and an external thread 4 situated at its front end 3. The external thread 4 has a center line 5 and begins with a thread start 6 at the front end 3. The external thread 4 can be an M12 thread. The beginning of a thread turn of the external thread 4 schematically depicted in FIGS. 2 and 3 is referred to as a thread start 6. The body 2 has a passage 7 in which an insulator 8 is fastened in an intrinsically known way. The insulator 8 encloses an internal conductor 9, which is connected to a center electrode 10. At the front end 11 of the insulator 8, the center electrode 10 protrudes therefrom and is provided with a reinforcing component 12 there. At the back end 13 of the pre-chamber spark plug 1, the insulator 8 protrudes from the body 2. The body 2 is provided with a hexagonal or bihex fitting 14 to permit it to be engaged by a screwing tool. An annular seat surface 16 for the insulator 8 is provided in the passage 7. Viewed from the back end 13 to the front end 3, the passage 7 narrows at the annular seat surface 16. A sealing ring is positioned between the seat surface 16 and a matching annular shoulder of the insulator 8. The front end 11 of the insulator 8 is embodied as an insulator foot and protrudes beyond the seat surface 16 in the direction of the front end 3 of the body. At least at the front end 11, the insulator foot is spaced apart from the inner wall of the passage 7 by a spacing distance R of approximately 1.4 mm extending in the circumference direction. The front end 11 of the insulator 8 is thus surrounded by an annular gap 18 with a width R, which can receive residual gases during a compression stroke.

Figure 5:
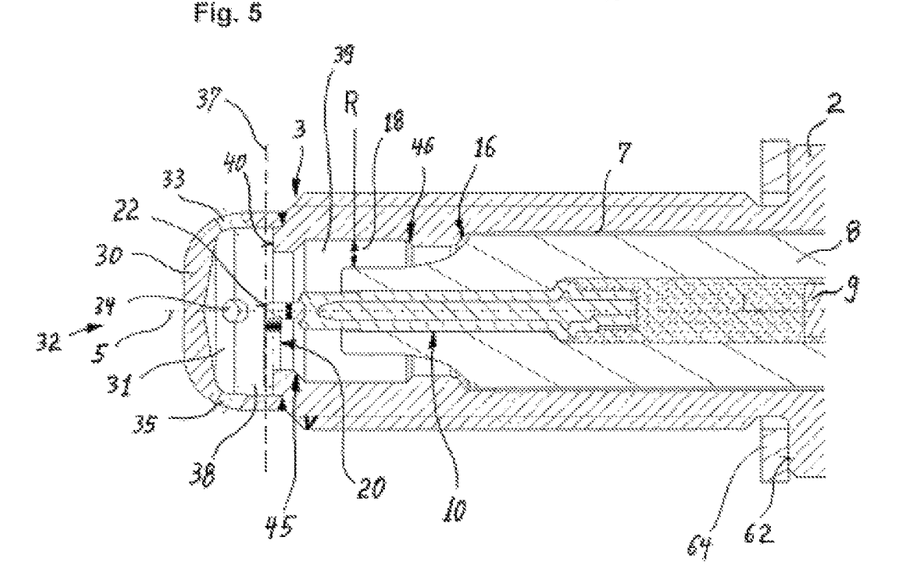
FIG. 5 shows a view similar to FIG. 4 of a variant of the pre-chamber spark plug.
Figure 6:
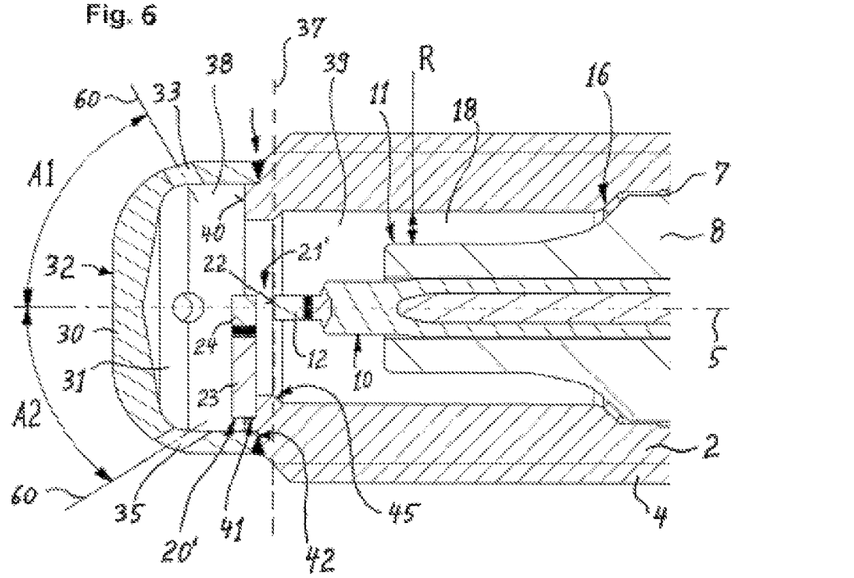
FIG. 6 shows a view similar to FIG. 4 of another variant of the pre-chamber spark plug.

The pre-chamber spark plug 1 according to FIGS. 1 through 4 and the variant shown in FIG. 5 has two ground electrodes 20 extending in a straight line, each forming a respective spark gap 21 with the circumference surface of the center electrode 10. In the variant shown in FIG. 6, only one ground electrode 20' is provided, which forms a spark gap 21' with the end surface 22 of the center electrode 10. Each of the ground electrodes 20, 20' is embodied of two parts, a supporting component 23 and a reinforcing component 24.

At the front end 3, the body 2 has a cap 30 welded to it, which delimits a pre-chamber 31 and shields the electrodes 10, 20 and the spark gap 21. The cap 30 protrudes beyond the front end 3 of the body 2 and delimits the front end 32 of the pre-chamber spark plug 1. The cap 30 has a plurality of openings 33, 34 and 35, which extend obliquely to the center line 5 and permit a gas exchange between the pre-chamber 31 and the space outside of the pre-chamber 31. The diameter of the circular openings 33, 34, 35 can be from 0.8 mm to 1.2 mm. An imaginary dividing plane, which extends perpendicular to the center line 5 and is indicated by the dashed line 37 in FIGS. 4 through 6, can be situated at the front end surface 22 of the center electrode 10. The dividing plane 37 divides the pre-chamber 31 into a front part 38 and a back part 39. The front part 38 is situated on the side of the dividing plane 37 oriented toward the front end 32 of the pre-chamber spark plug 1, and the back part 39 of the pre-chamber 31 is situated on the side of the dividing plane 37 oriented toward the back end 13. The back part 39 is situated entirely inside the pre-chamber spark plug 1. The front part 38 and the back part 39 are connected to each other at the dividing plane 37 so that a gas exchange between the front part 38 and the back part 39 can take place via the dividing plane 37. Apart from this connection to the front part 38, the back part 39 is closed in a gastight fashion. All of the openings 33, 34, 35 feed into the front part 38. A total volume Vv+Vh of the pre-chamber 31 is composed of the sum of a volume Vv of the front part 38 and a volume Vh of the back part 39 of the pre-chamber 31. In the region of the openings 33, 34 and 35, the front volume Vv extends up to the outer surface of the cap 30 so that the front volume Vv also comprises the volumes of the openings 33, 34, 35 inside the wall of the cap 30. The volume Vh of the back part 39 is greater than the volume Vv of the front part 38, in particular by a factor of 1.6 to 1.7.

At the front end 3, the body 2 has an end surface 40 on which a fastening point of the ground electrode 20 is provided. For each ground electrode 20, a groove 41 is provided in the end surface 40 at the fastening point; the supporting component 23 sits in this groove 41 and is welded to the body 2, in particular by means of resistance welding. At the front end 3, the body 2 has a step 42 extending in the circumference direction, which faces radially outward. The cap 30 is placed onto this step 42 and is welded to the body 2 there. Depending on the embodiment, the end surface 40 and/or the ground electrode 20 can be positioned in the back part 39 of the pre-chamber 31; see FIGS. 4 and 5, or, in the front part 38, see FIG. 6.

Viewed from the back end 13 to the front end 3, the passage 7 of the body 2 narrows at a point 45. The constriction 45 is situated between the seat surface 16 and the ground electrode 20. At the constriction 45, the body 2 protrudes like a balcony into the pre-chamber 31. This improves the fastening of the ground electrode 20. As shown in FIG. 5, when viewed from back to front, the passage 7 can widen at a point 46, which is situated between the constriction formed by the seat surface 16 and the constriction 45. The annular seat surface 16 can thus widen out so that the insulator 8 can be better supported on the body 2. The widening 46 can also increase the width R of the annular gap 18. This can be advantageous for permitting better flushing of residual gases out of the annular gap 18 and for achieving a correspondingly large volume Vh of the back part 39 of the pre-chamber 31, which offers enough space in the back part to accommodate any residual gases still remaining.

FIG. 1 shows how the pre-chamber spark plug 1 is screwed with its external thread 4 into an internal combustion engine 50. The internal combustion engine 50 has a housing, which includes an engine block 51 and a cylinder head 52 and which has a plurality of cylinders 53, one of which is partially depicted in FIG. 1. The cylinder 53 has a piston 54 that is able to move in the engine block 51. The engine block 51, the cylinder head 52, and the piston 54 delimit a combustion chamber 55, the volume of which changes as the piston 54 moves. The piston displacement of the cylinder 53 can lie in the range from 300 cm³ to 500 cm³. The combustion chamber 55 is fed by a conduit 56, which can be an intake duct or an exhaust duct. The conduit 56 can be closed by a valve 57. Internal combustion engines 50 of this kind and the way in which they function are known in and of themselves. When the piston 54 is at its top dead center, the combustion chamber 55 has its smallest volume, which is referred to as the "compressed volume." The total volume Vv+Vh of the pre-chamber 31 lies in the range from 0.7% to 1% of the compressed volume Vc. The volume Vc is from 50 cm³ to 80 cm³ while the total volume Vv+Vh lies in the range from 0.3 cm³ to 0.8 cm³.

The cap 30 shields the center electrode 10 and the ground electrode 20 from the combustion chamber 55. The openings 33, 34 and 35 permit a gas exchange between the combustion chamber 55 and the pre-chamber 31. When the piston 54 moves upward during the compression stroke, fresh fuel/air mixture is pushed from the combustion chamber 55 through the openings 33, 34, and 35 into the pre-chamber 31. Residual gases remaining in the pre-chamber 31 are displaced into the back part 39 so that fresh mixture travels to the spark gap 21. Each of the openings 33, 34, and 35 has a center line 60, which extends along the direction in which the openings 33, 34 and 35 extend and intersects with the wall of the cap 30. The center lines 60 of the openings 33, 34 and 35 each intersect with the center line 5 of the external thread 4. The center line 60 of the opening 33 is oriented at an angle A1 relative to the center line 5 and the center line 60 of the opening 35 is oriented at an angle A2 relative to the center line 5. The angles A1 and A2 are different and can be from 45° to 60°. The center lines of all of the openings in the cap 30 intersect the center line 5 of the external thread 4 in order to enable a swirl-free flow of the fresh fuel/air mixture into the pre-chamber 31.

The openings 33, 34 and 35 each have a predefined position in the circumference direction of the body 2 and have a predefined orientation relative to the thread start 6. The predefined orientation is the same in all of the pre-chamber spark plugs 1 of the same internal combustion engine 50 in order to achieve the same conditions in each of its cylinders 53. The openings 33, 34 and 35 have the same orientation relative to the conduit 56 and the valve 57. The ignition torches, which shoot out of the openings 33, 34, 35 into the combustion chamber 55 after the ignition of the fuel/air mixture in the pre-chamber 31 and which are indicated by the arrows 58 in FIG. 1, therefore likewise have a predefined orientation in the combustion chamber 55. An ignition torch 58 can, for example, point definitely in the direction of a valve 57 or can point into a region between two valves 57. This can improve the ignition of a lean fuel/air mixture in the combustion chamber 55.

Adjacent to the external thread 4 at the rear end 13 thereof, the body 2 has a collar with an external sealing seat 62, which limits how far the pre-chamber spark plug 1 can be screwed into the internal combustion engine 50. The external sealing seat 62 is associated with a sealing ring 64 for sealing the combustion chamber 55. If a plurality of pre-chamber spark plugs 1 are screwed into the cylinder head 53 with the prescribed tightening torque, then the external sealing seat 62 ensures that the openings 33, 34 and 35 have the same orientation in all of the pre-chamber spark plugs 1 of the internal combustion engine 50 so that in all of the cylinders 53, the ignition torches 58 likewise have the desired orientation in the combustion chamber 55, which is suitable for a good ignition.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

| List of Reference Numerals | |
| --- | --- |
| 1 | pre-chamber spark plug |
| 2 | body |
| 3 | front end |
| 4 | external thread |
| 5 | center line |
| 6 | thread start |
| 7 | passage |
| 8 | insulator |
| 9 | internal conductor |
| 10 | center electrode |
| 11 | front end |
| 12 | reinforcing component |
| 13 | back end |
| 14 | bihex fitting |
| 16 | seat surface |
| 18 | annular gap |
| 20, 20' | ground electrode |
| 21, 21' | spark gap |
| 22 | end surface |
| 23 | supporting component |
| 24 | reinforcing component |
| 30 | cap |
| 31 | pre-chamber |
| 32 | front end |
| 33 | opening |
| 34 | opening |
| 35 | opening |
| 37 | dividing plane |
| 38 | front part |
| 39 | back part |
| 40 | end surface |
| 41 | groove |
| 42 | step |
| 45 | constriction |
| 46 | widening |
| 50 | internal combustion engine |
| 51 | engine block |
| 52 | cylinder head |
| 53 | cylinder |
| 54 | piston |
| 55 | combustion chamber |
| 56 | conduit |
| 57 | valve |
| 58 | ignition torch |
| 60 | center line |
| 62 | external sealing seat |
| 64 | sealing ring |
| A1, A2 | angle |
| R | spacing distance |
| Vc | compressed volume |
| Vh | back volume |
| Vv | front volume |

The invention claimed is:

1. An internal combustion engine, comprising:
a housing with at least one cylinder and a pre-chamber spark plug;
the cylinder has a piston that is able to move in the housing and delimits a combustion chamber contained in the housing, a volume of which changes as the piston moves;
the combustion chamber has a compressed volume when the piston is at a top dead center position;
the pre-chamber spark plug has a body, an external thread at a front end, a passage, an insulator positioned in the passage, a center electrode protruding from the front end of the insulator, and a pre-chamber-forming cap that is placed at the front end of the body and that delimits a pre-chamber;
the cap shields the center electrode from the combustion chamber and has at least one opening that enables a gas exchange between the pre-chamber and the combustion chamber, wherein a total volume of the pre-chamber makes up at least 0.65% of a compressed volume of the combustion chamber.

2. The internal combustion engine according to claim 1, wherein the total volume of the pre-chamber is in a range from 0.65% to 1.9% of the compressed volume of the combustion chamber.

3. The internal combustion engine according to claim 1, wherein the total volume of the pre-chamber is in a range from 0.2 $cm^3$ to 1 $cm^3$.

4. The internal combustion engine according to claim 1, wherein the compressed volume of the combustion chamber is in a range from 30 $cm^3$ to 100 $cm^3$.

5. The internal combustion engine according to claim 1, wherein the cap of the pre-chamber spark plug has 3 to 9 openings.

6. The internal combustion engine according to claim 1, wherein the at least one opening in the cap of the pre-chamber spark plug has a diameter of 0.6 mm to 1.6 mm.

7. The internal combustion engine according to claim 1, wherein the pre-chamber spark plug further comprises:
an annular seat surface for the insulator is provided in the passage of the body;
the passage narrows at the seat surface, when viewed from a back end to the front end.

8. The pre-chamber spark plug according to claim 7, wherein the front end of the insulator protrudes forward beyond the seat surface into the pre-chamber and is spaced apart from the body by a spacing distance of at least 1.2 mm extending in the circumference direction.

9. The pre-chamber spark plug according to claim 7, wherein the passage, when viewed from the back end to the front end, narrows at a point situated between the annular seat surface for the insulator and the ground electrode.

10. The pre-chamber spark plug according to claim 7, wherein the passage, when viewed from the back end to the front end, widens at a point situated between the annular seat surface for the insulator and the front end of the insulator.

11. The internal combustion engine according to claim 1, wherein:
the pre-chamber can be divided into a front part and a back part by an imaginary dividing plane that extends perpendicular to a center line of the external thread at the end surface of the center electrode that protrudes from the insulator;
the front part of the pre-chamber is situated on a side of the dividing plane oriented toward the front end of the pre-chamber spark plug;
the back part of the pre-chamber is situated on a side of the dividing plane oriented toward the back end of the pre-chamber spark plug and is situated inside the pre-chamber spark plug, and, apart from its connection to the front part of the pre-chamber at the dividing plane, the back part of the pre-chamber is closed in a gastight fashion; and
a volume of the back part of the pre-chamber is greater than a volume of the front part of the pre-chamber.

12. The internal combustion engine according to claim 11, wherein the volume of the back part of the pre-chamber is greater than the volume of the front part of the pre-chamber by a factor of 1.5 to 2.0.

13. The internal combustion engine according to claim 1, wherein the opening in the cap has a center line that intersects a center line of the external thread.

14. The internal combustion engine according to claim 1, wherein the internal combustion engine further comprises:
a plurality of cylinders, each of which has a combustion chamber and a conduit feeding into the combustion chamber; and a plurality of pre-chamber spark plugs, each of which is installed in a cylinder of the internal combustion engine and has a cap shield with an opening, wherein the openings in the cap shields of the pre-chamber spark plugs have the same orientation relative to the conduit.

15. A pre-chamber spark plug, comprising:

a body, an external thread at a front end, a passage, an insulator positioned in the passage, a center electrode protruding from the front end of the insulator, and a pre-chamber-forming cap that is placed at the front end of the body and that delimits a pre-chamber;

the cap shields the center electrode from the combustion chamber and has at least one opening that enables a gas exchange between the pre-chamber and the combustion chamber;

the pre-chamber is configured to be divided into a front part and a back part by an imaginary dividing plane that extends perpendicular to a center line of the external thread at the end surface of the center electrode that protrudes from the insulator;

the front part of the pre-chamber is situated on a side of the dividing plane oriented toward the front end of the pre-chamber spark plug;

the back part of the pre-chamber is situated on a side of the dividing plane oriented toward the back end of the pre-chamber spark plug and is situated inside the pre-chamber spark plug, and, apart from its connection to the front part of the pre-chamber at the dividing plane, the back part of the pre-chamber is closed in a gastight fashion; and a volume of the back part of the pre-chamber is greater than a volume of the front part of the pre-chamber.

\* \* \* \* \*

United States Patent
Niessner et al.

(12) EX PARTE REEXAMINATION CERTIFICATE (12211th)

(10) Number: US 10,658,818 C1
(45) Certificate Issued: Jan. 20, 2023

(54) COMBUSTION ENGINE WITH PRE-CHAMBER SPARK PLUG

(71) Applicant: Federal-Mogul Ignition GmbH, Neuhaus-Schierschnitz (DE)

(72) Inventors: Werner Niessner, Steinheim (DE); Matthias Blankmeister, Heiligenhaus (DE)

(73) Assignee: FEDERAL-MOGUL IGNITION GMBH, Neuhaus-Schierschnitz (DE)

Reexamination Request:
No. 90/014,928, Dec. 22, 2021

Reexamination Certificate for:
Patent No.: 10,658,818
Issued: May 19, 2020
Appl. No.: 15/945,048
Filed: Apr. 4, 2018

(30) Foreign Application Priority Data

Apr. 10, 2017 (DE) .......................... 10 2017 107 683

(51) Int. Cl.
H01T 13/06 (2006.01)
H01T 13/54 (2006.01)
H01T 13/08 (2006.01)
F02B 19/12 (2006.01)

(52) U.S. Cl.
CPC .............. H01T 13/08 (2013.01); F02B 19/12 (2013.01); H01T 13/06 (2013.01); H01T 13/54 (2013.01)

(58) Field of Classification Search
CPC ................................ H01T 13/06; H01T 13/54
USPC .................................... 123/259, 260; 313/143
See application file for complete search history.

(56) References Cited

To view the complete listing of prior art documents cited during the proceeding for Reexamination Control Number 90/014,928, please refer to the USPTO's Patent Electronic System.

Primary Examiner — Russell D Stormer

(57) ABSTRACT

An internal combustion engine having: a housing with at least one cylinder and a pre-chamber spark plug; the cylinder has a piston that is able to move in the housing and delimits a combustion chamber contained in the housing; the combustion chamber has a compressed volume when the piston is at top dead center; the pre-chamber spark plug has a body, an external thread at its front end, a passage, an insulator positioned in the passage, a center electrode protruding from the front end of the insulator, and a pre-chamber-forming cap that is placed at the front end of the body and delimits a pre-chamber. The cap shields the center electrode from the combustion chamber and has at least one opening, which enables a gas exchange between the pre-chamber and the combustion chamber. In one embodiment, the total volume of the pre-chamber makes up at least 0.65% of the compressed volume of the combustion chamber.

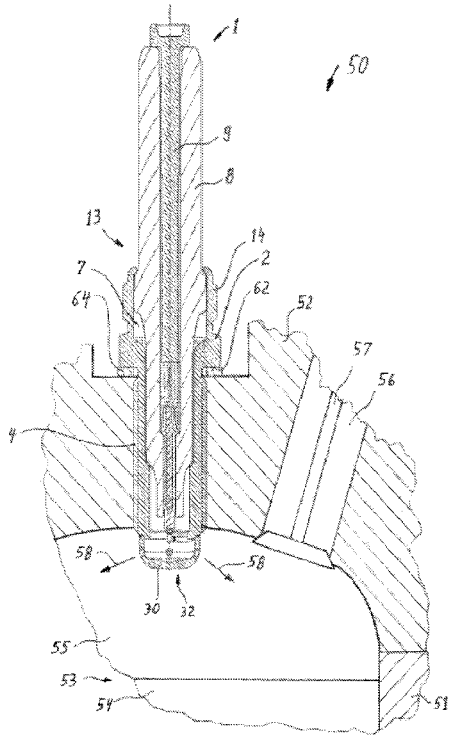

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-15 are cancelled.

* * * * *